United States Patent [19]

Wolfe

[11] Patent Number: 5,104,031
[45] Date of Patent: Apr. 14, 1992

[54] DISTRIBUTOR TUBE END FORMER

[75] Inventor: Michael E. Wolfe, Reynoldsburg, Ohio

[73] Assignee: Lennox Industries, Inc., Dallas, Tex.

[21] Appl. No.: 722,689

[22] Filed: Jun. 28, 1991

[51] Int. Cl.⁵ .......................... B23K 1/00; B21C 37/16
[52] U.S. Cl. ..................................... 228/154; 72/115; 72/125; 228/173.4
[58] Field of Search .............. 228/154, 173.4; 29/890; 285/177, 287; 72/125, 112, 115, 116, 117, 370

[56] References Cited

U.S. PATENT DOCUMENTS

| | | | |
|---|---|---|---|
| 1,938,194 | 12/1933 | Rader | 72/117 |
| 1,998,653 | 4/1935 | Briegel | 72/125 |
| 2,005,969 | 6/1935 | Cornell | 285/177 |
| 2,346,376 | 4/1944 | Heavener | 72/125 |

FOREIGN PATENT DOCUMENTS

| | | | |
|---|---|---|---|
| 1026039 | 4/1953 | France | 72/116 |
| 1538963 | 1/1990 | U.S.S.R. | 72/112 |
| 560205 | 3/1944 | United Kingdom | 72/112 |

*Primary Examiner*—Kenneth J. Ramsey
*Attorney, Agent, or Firm*—Allegretti & Witcoff, Ltd.

[57] ABSTRACT

A method of forming a joint between a workable tubing of a first diameter and a tubing of a second, larger diameter proceeds with the formation of a bell in the end of the workable tubing. The workable tubing is clamped, with the end of the workable tubing located in a cavity of a die. A mandrel is spun, and inserted into the end of the workable tubing. The mandrel has a pilot tip, and a forming land. The forming land expands the end of the workable tubing as the mandrel is spun. A bell is formed in the workable tubing, which has an outer diameter substantially equal to the inner diameter of the second, larger tubing. The workable tubing is freed from the clamp and die, and the bell is inserted into the second, larger tubing. The two tubes are brazed, without need for a bushing.

2 Claims, 5 Drawing Sheets

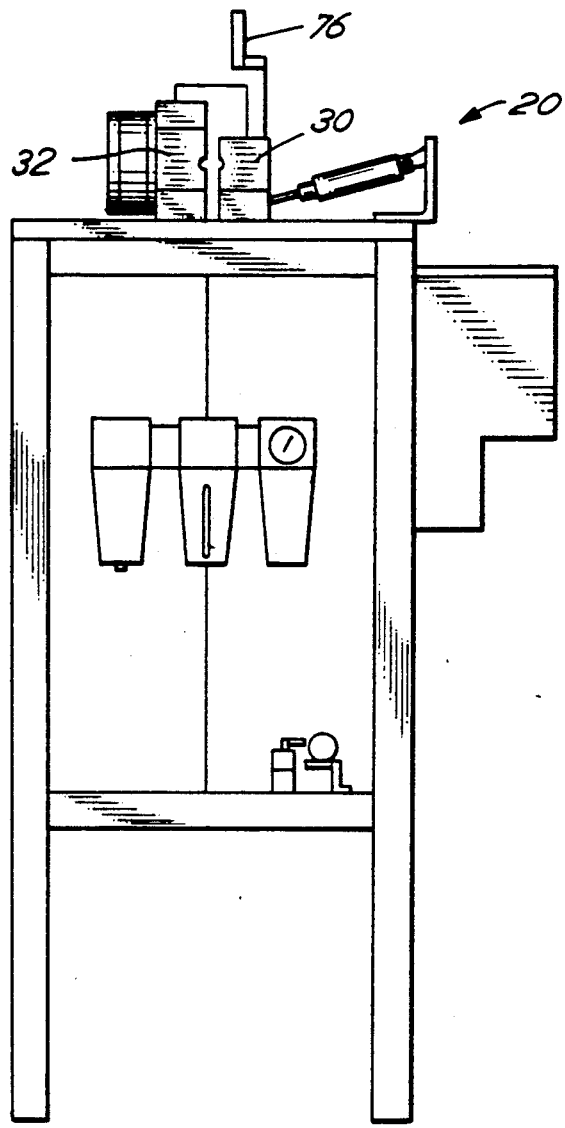
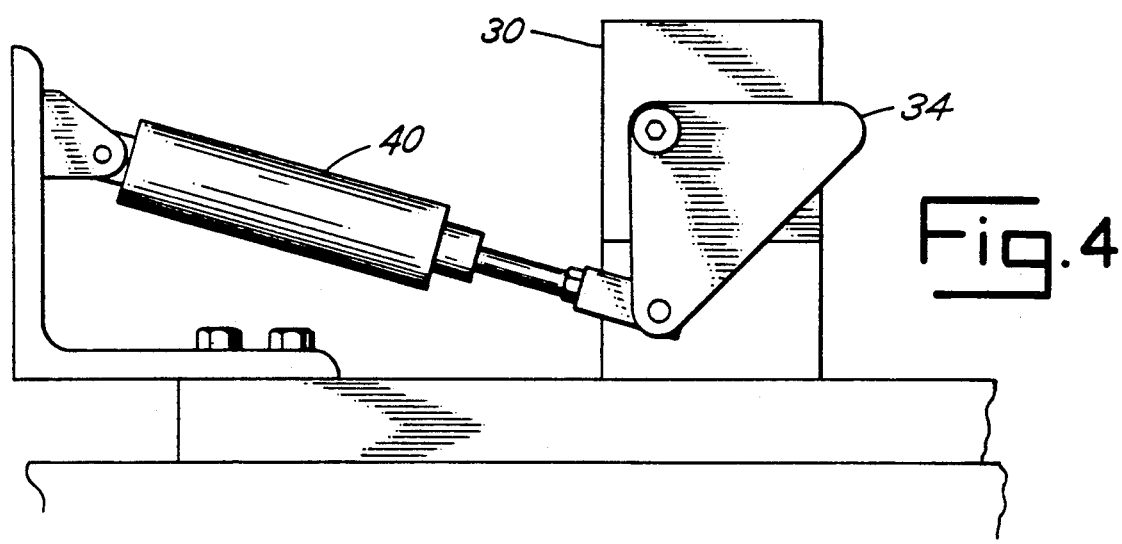

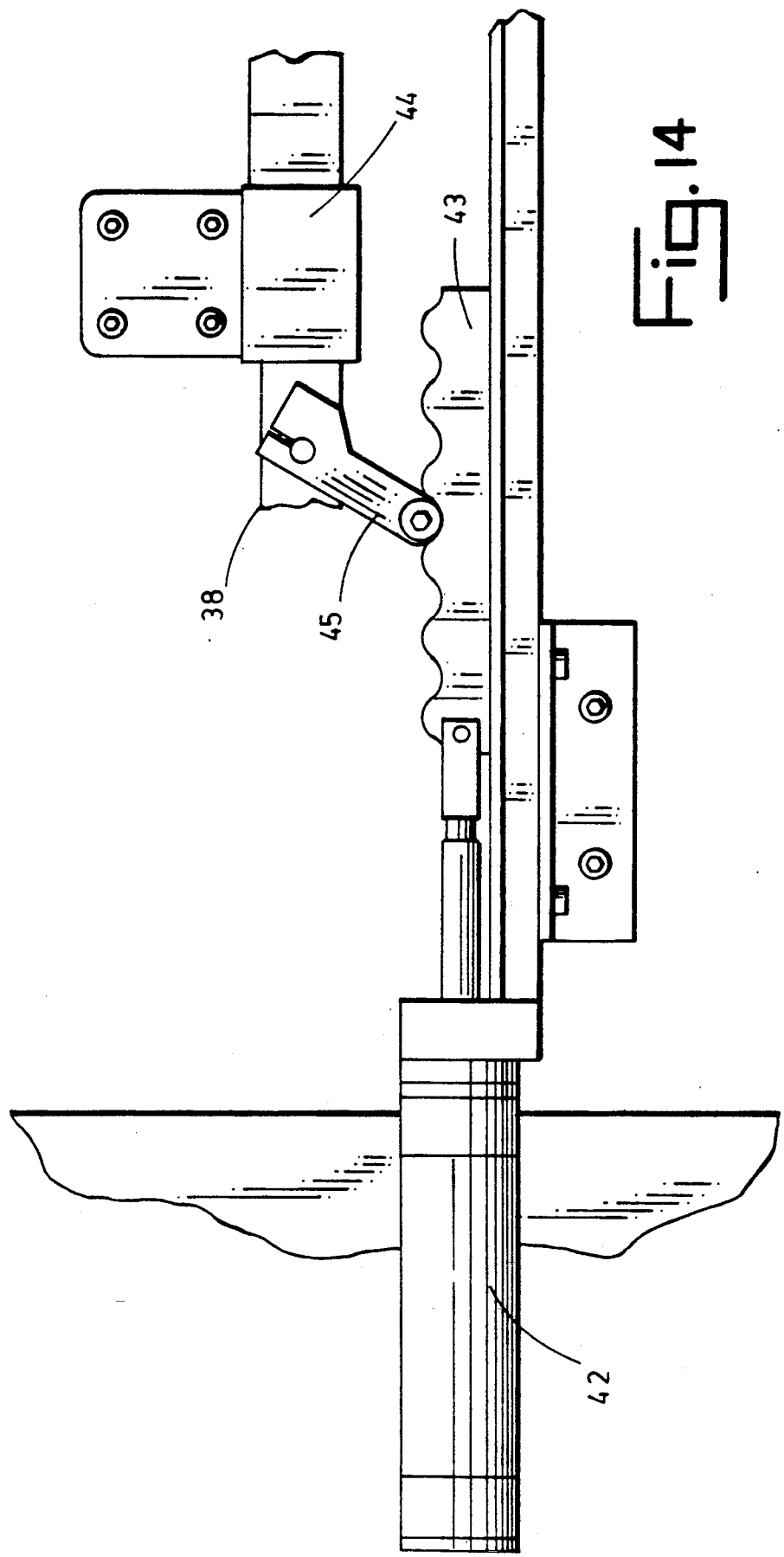

DISTRIBUTOR TUBE END FORMER

BACKGROUND OF THE INVENTION

This invention relates to tubing joints and machines and methods for the formation of joints in tubing, and more particularly, to a machine and method for enlarging the ends of copper tubing to provide for joints of the tubing to tubing of larger diameters.

In the manufacture of heating and air conditioning mechanism, it has long been necessary to join copper tubing of a first size to copper tubing of a second, larger size. As an example, in a distributor assembly as shown in FIG. 9, copper distributor tubes 10 have an outer diameter such as 0.1875 inches. It is necessary to join the distributor tubes to coil tubes (not shown) having an inner diameter of 0.375 inches. In the past, the joints of the distributor tubes and coil tubes have been formed by insertion of the ends of the distributor tubes into the open ends of the coil tubes, with a bushing between the tubes. The ends have then been brazed. The formation of the joints has been difficult. The process has been performed manually, with the length of insertion of the ends of the first tubes into the second tubes subject to manual variation. Formation of joints in the described manner has resulted in joints which may partially block the tubes, or leak.

It is an object of the present invention to provide a new machine and method for the formation of joints in tubing.

Advantages of the present invention include high speed, inexpensive formation of reliable joints, and the elimination of bushings.

A full understanding of the objects, features and advantages of the invention will be provided by a reading of the summary of the invention and detailed description of the preferred embodiment of the invention, which follow.

SUMMARY OF THE INVENTION

In a principal aspect, the invention of this specification is a method of forming a joint between a workable tubing of a first diameter and a tubing of a second, larger diameter. The method proceeds with the formation of a bell in the end of the workable tubing. First, the workable tubing is clamped, with the end of the workable tubing located in a cavity of a die. Next, a mandrel is spun, and inserted into the end of the workable tubing. The mandrel has a pilot tip, and a forming land. The forming land expands the end of the workable tubing as the mandrel is spun. In a matter of seconds, a bell is formed in the workable tubing, which has an outer diameter substantially equal to the inner diameter of the second, larger tubing. The workable tubing is freed from the clamp and die, and the bell is inserted into the second, larger tubing. The two tubes are brazed, without need for a bushing.

This principal aspect and other principal aspects of the invention are more fully appreciated by a reading of the detailed description of the preferred embodiment of the invention, which follows.

BRIEF DESCRIPTION OF THE DRAWING

The accompanying drawing illustrates the preferred embodiment of the invention. The machine of the drawing is not the only form which the invention as claimed may take. The drawing and the following detailed description of the preferred embodiment are intended to limit the claims only as consistent with the law of claim interpretation, whereby claims are interpreted in light of the specification and drawing.

The description which follows refers to the components of the machine in such spatial terms as "front", "rear", "upper", "lower" "left", "right", etc. Terms such as these, which depend of the specific spatial orientation of the components, are intended for the aid of the reader, and except as incorporated into the claims, not as a limitation on the possible orientation of components in any possible alternate, but covered, embodiment of the invention. Except as consistent with the law of claim interpretation, the drawing and following description are only illustrative of the invention.

Figure 1:
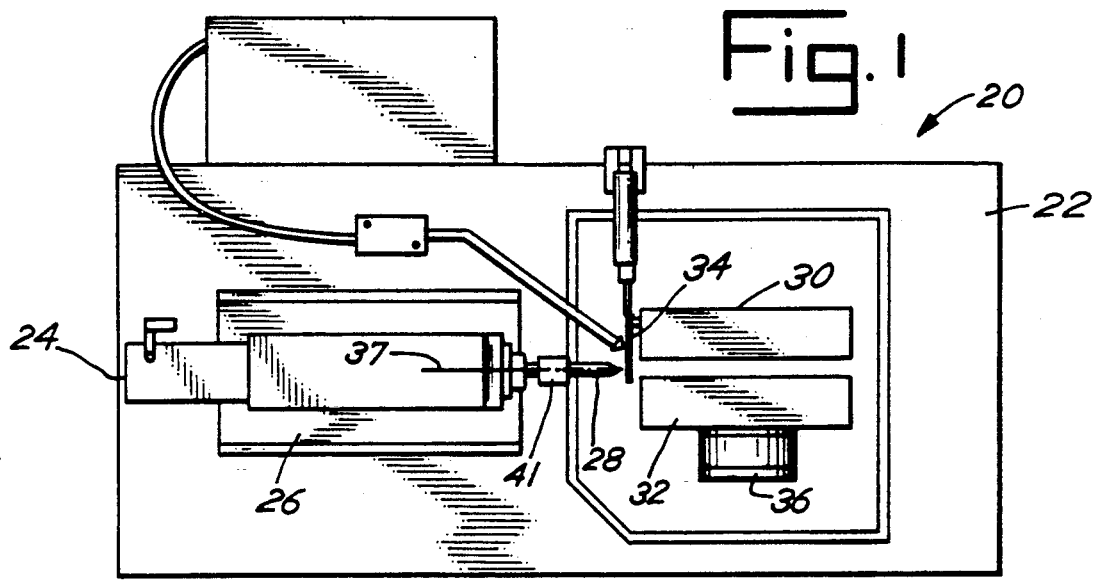
Figure 2:
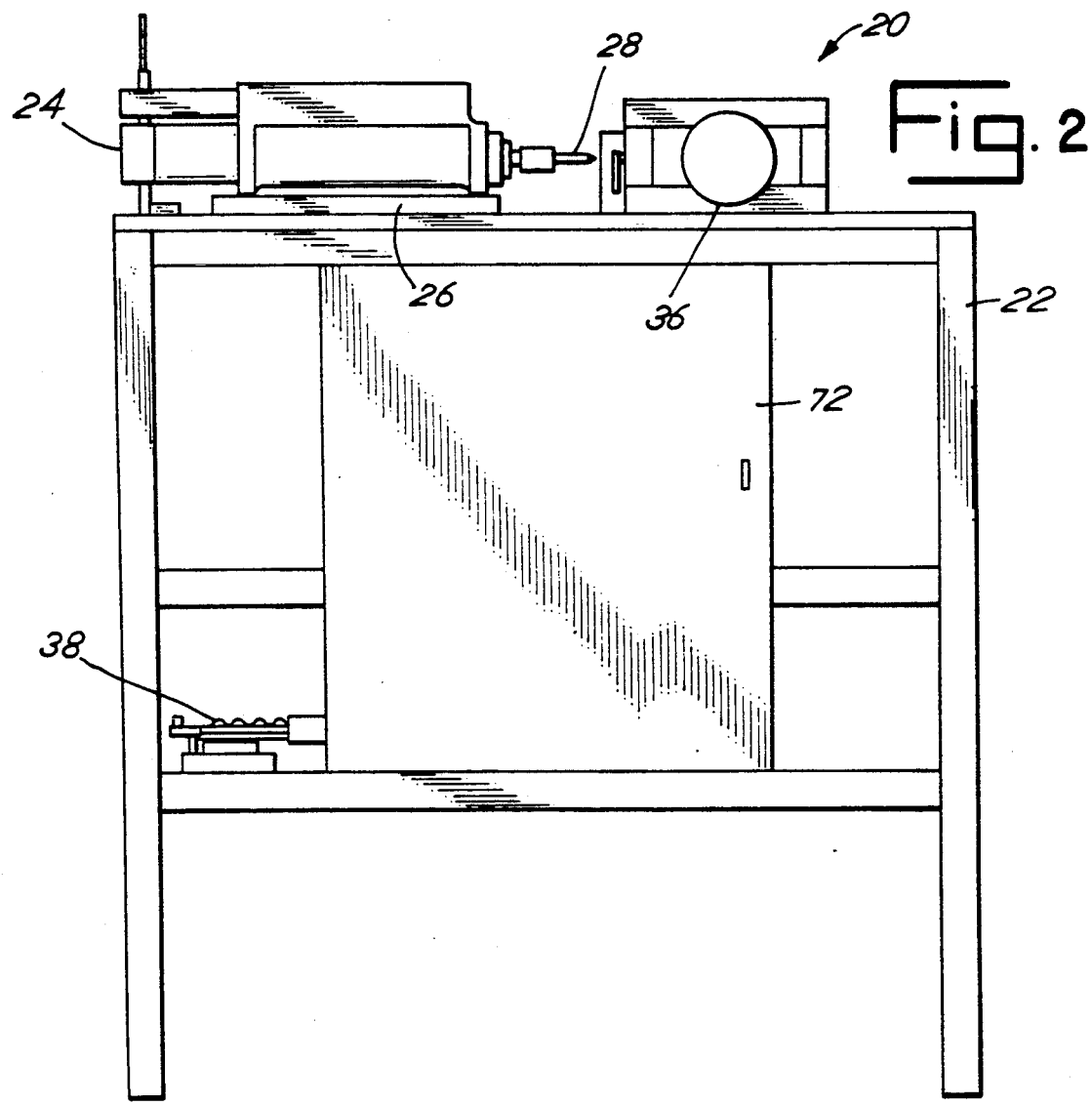
Figure 5:
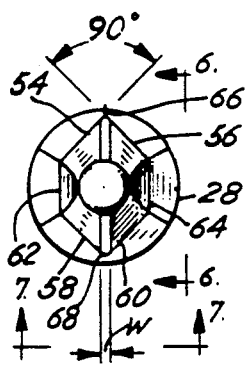
Figure 6:
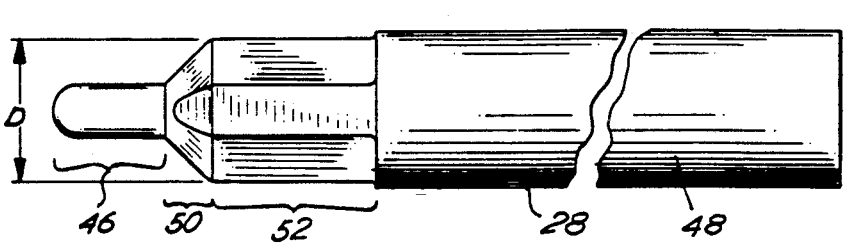
Figure 7:
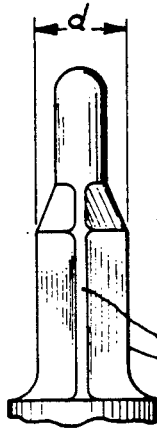
Figure 8:
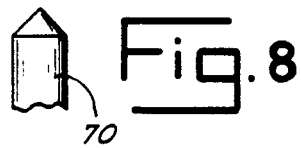
Figure 9:
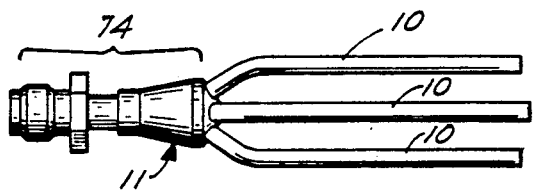
Figure 10:
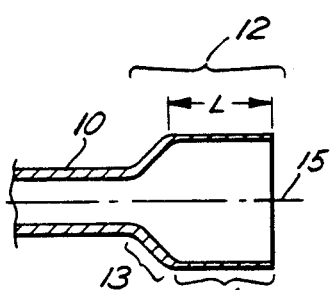
Figure 11:
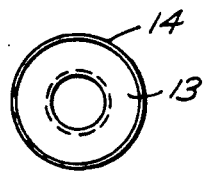
Figure 13:
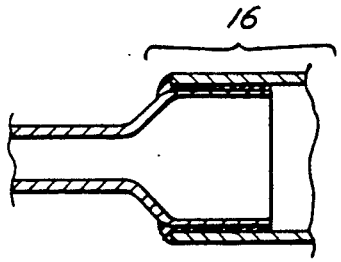
Figure 12:
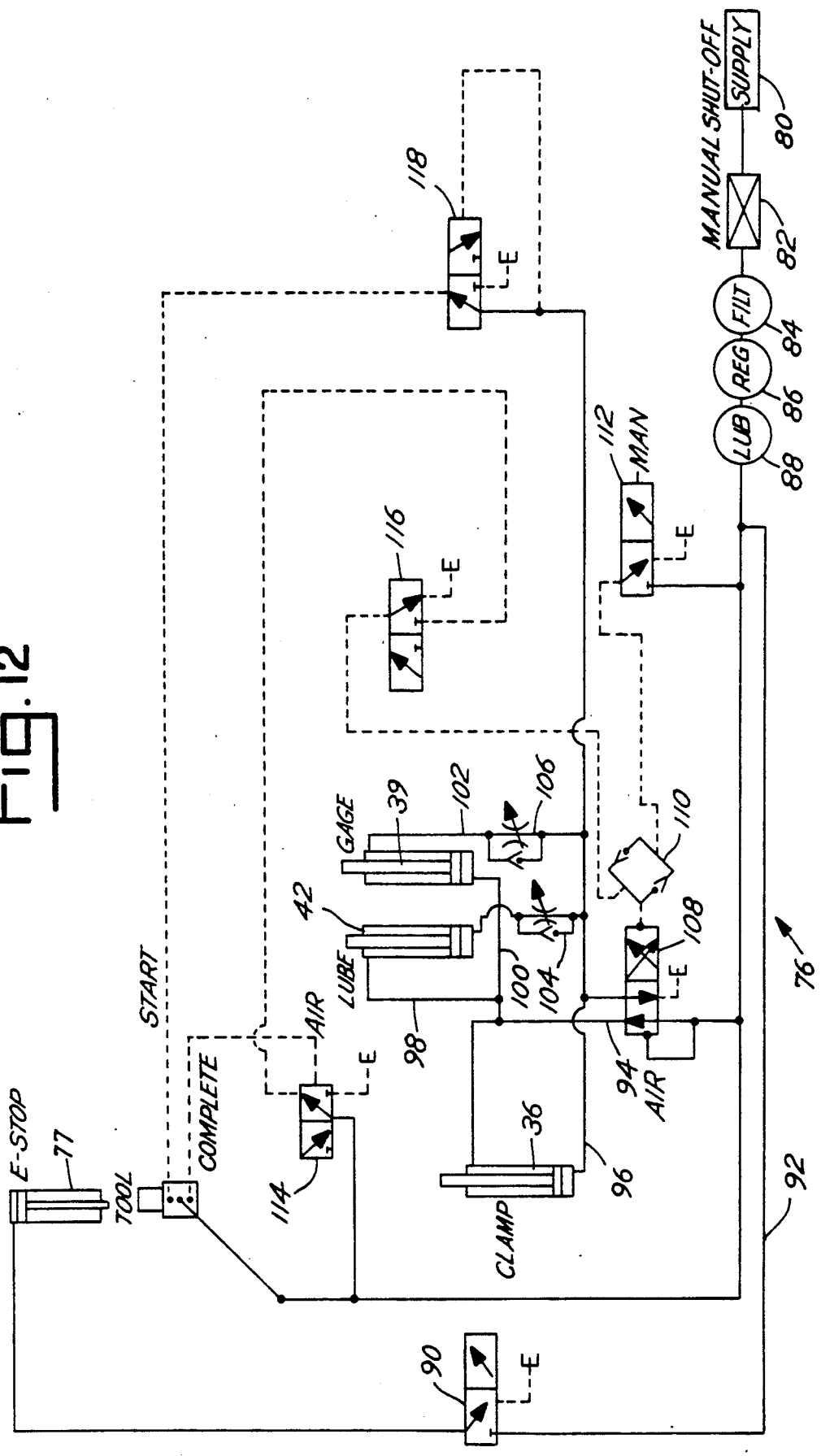

For orientation of the reader to the drawing, and for ease of beginning of reading of the following detailed description, a brief description of the drawing is as follows:

FIG. 1 is a plan (top looking down) view of the preferred machine of the invention;

FIG. 2 is an front elevation view of the preferred machine of the invention;

FIG. 3 is a side elevation view of the preferred machine;

FIG. 4 is a reverse side elevation view of a drive for a slide of the preferred machine, seen to the upper right in FIG. 3;

FIG. 5 is an end view of the mandrel of the preferred machine;

FIG. 6 is a side view of the mandrel of FIG. 5, taken along line 6—6 of FIG. 5;

FIG. 7 is another side view of the mandrel, taken along line 7—7 of FIG. 5;

FIG. 8 is a view of a variation of the pilot tip of the mandrel of the preferred machine;

FIG. 9 is a view of a distributor assembly having distributor tubes which require joints to larger diameter tubes;

FIG. 10 is a central cross-section view of a bell in a tube, formed in the invented method and machine;

FIG. 11 is an end view of the bell of FIG. 10;

FIG. 12 is a schematic view of a control for the preferred machine;

FIG. 13 is a cross-sectional view of a joint formed according to the preferred processes of the invention; and FIG. 14 is a side elevation view of a lubrication activator of the preferred machine.

DETAILED DESCRIPTION OF THE PREFERRED EMBODIMENT

Referring to FIG. 9, in the manufacture of heating and air conditioning mechanisms, it has long been necessary to join copper tubing of a first size to copper tubing of a second, larger size. As an example, in a distributor assembly 11, copper distributor tubes 10 have an outer diameter such as 0.1875 inches. It is necessary to join the distributor tubes to coil tubes (not shown) having an inner diameter of 0.375 inches. In the past, the joints of the distributor tubes and coil tubes have been formed manually. Production personnal have inserted the ends of the distributor tubes into the open ends of the coil tubes, with a bushing between the tubes. The distance by which the distributor tubes have been inserted into the coil tubes has been set manually, visually. The ends of the tubes have then been brazed. Formation of joints in the described manner has resulted in joints which may partially block the tubes, or leak. The problems with the joints are believed to be caused by variations in the joints due to manual formation under only visual control.

Referring to FIGS. 10 and 11, an important aspect of the invention is the formation of a bell 12 in the end of a tube such as a distributor tube 10. The bell is formed of material which is integral to the tube, by expansion and thinning of the wall of the tube. As preferred, a bell 12 formed in a tube 10 has an outer diameter substantially equal to 0.375 inches, the dimension of the inner diameter of a coil tube. The bell has a section 14 which is annular, with a cylindrical sidewall coaxial with the sidewall of the tube 10, along an axis 15. The section 14 has a length "L" of approximately 0.312 inches. The bell 12 also has a shoulder 12 which forms the transition from the non-expanded portion of the tube 10 to the expanded bell sidewall section 14. The shoulder has the shape of a truncated cone, with a surface which lies at an angle of approximately 45 degrees relative to the axis of the bell sidewall section 14.

Referring to FIG. 13, a tubing joint 16 formed by the processes of the invention, as between a tube 10 and a coil tube 18 is a secure, reliable joint.

Referring now to FIGS. 1, 2 and 3, a bell 12 is formed in a tube 10 in an apparatus 20. A base 22, in the form of a table, supports a plurality of mechanism, including a motor 24, a motor mount 26, a mandrel 28, a pair of co-operating die members 30, 32, an end gauge 34, a slide actuator 36, and a lube activator 38. The mechanisms co-operate to form one bell in one tube in about 3 seconds, after manual location of the tube.

Referring again to FIG. 2, a preferred motor 24 is a one horsepower self-feeding air drill operating at approximately 900 revolutions per minute. Such a motor starts on a pulse of air from a control valve, and delivers a pulse of air back to air control logic upon completion of a cycle of operation. Modes and depth of stroke are adjustable. The motor 24 defines an axis 40 for rotation of a chuck 41. The motor advances the chuck along the axis 40 as it spins the chuck.

The die members 30, 32 lie forward of the chuck 41. Each die member 30, 32 defines one half of a die cavity. The die cavity is in the shape of a tube 10, with a bell 12 facing the chuck 41. The die cavity is thus longitudinally elongated, and is split longitudinally, with one half formed in die member 30, and one half formed in die member 32. The slide actuator 36 moves the die members transversely, to bring the die members together in alignment along the axis 40, in response to air control logic.

The end gauge 34 is located between the die members 30, 32, and the motor 26. Referring to FIG. 4, the end gauge 34 is movable under the action of an air cylinder 39 across the axis 40 and away from the axis 40.

The lube activator 38 is located away from the motor 24, with lubricating oil being sprayed in the area of the mandrel 28 by connection to and from an oil reservoir. Referring to FIG. 14, the lube activator 38 includes a slide arm 45 on an air switch 44. An air cylinder 42 drives a rack 43 under the slide arm 45 to trip the air switch 44 a plurality of times during the formation of a bell, to provide lubrication the same plurality of times.

Referring to FIGS. 5 through 8, the preferred mandrel 28 is longitudinally elongated, and includes four sections. A pilot section 46 has a circular transverse cross-section a diameter of approximately 0.117 inches, less than the inner diameter of the tubes 10, a hemispherical tip, and a length of approximately 0.280 inches. An alternate pilot section 70, with a conical tip, as in FIG. 8, is acceptable. A body section 48 extends the mandrel to a length of approximately 3 inches, and has a circular cross-section, for placement in the chuck 41. Between the pilot section 46 and the body section 48, a shoulder section 50 extends to a sidewall section 52. The sidewall section is six-sided, with a major diameter "D" of approximately 0.340 inches across the junctures between two pairs of opposed sides or faces 54, 56 and 58, 60, and a minor diameter "d" of approximately 0.215 inches between the remaining sides 62, 64.

Two opposed forming lands 66, 68 extend along both the shoulder section 50 and the sidewall section 52 of the mandrel. The faces 54, 56 form an angle of approximately 90 degrees to each other, as shown in FIG. 5. The faces 58, 60 also form an angle of approximately 90 degrees to each other. The lands 66, 68 are radiused to blend into the adjacent faces, as shown in FIG. 5, and each has a width "w" of approximately one-sixty-fourth of an inch.

As should now be apparent, the mandrel 28 is placed in the chuck 41 with the pilot section 46 toward the die members 30, 32 and toward the "workpiece" (a tube) to be placed therein.

To complete the preferred apparatus, a pneumatic control circuit 76, as disclosed in FIG. 12 includes the components previously discussed, and control valves located in a cabinet 72, shown in FIG. 1.

As shown in FIG. 12, hoses connect to a supply of air 80 through a manual shut-off 82, filter 84, regulator 86 and lubricator 88. A valve 90 associated with the emergency stop 77 is connected to supply via a hose 92. Air cylinders 36, 39, 42, described above, are shown in association with lines 94, 96, 98, 100, 102, and flow control 104, 106. A four-way valve 108, shuttle valve 110, foot-operated valve 112, and three-way valves 114, 116, 118 complete the circuit.

With preferred mechanisms as now described, the preferred method of the invention is practiced as follows. First, a tube to be joined to a larger diameter tube is manually located in the die cavity in the die member 30, with its forward end abutting the end gauge 34. For an assembly such as distributor assembly 11, a tube 10 is placed in the die member 30 with the fitting 74 located to the right of the die member 30, as the die member 30 is oriented in FIG. 1.

A foot pedal (not shown) connected to the control logic is depressed. In response, the slide actuator 36 drives the die members 30, 32 together. The tube 10 is held between the die members by the die members, and is clamped by the die members. Under action of the control logic, the end gauge 34 retracts. (Should the need arise, an emergency stop 77 may be used at any time.)

The motor 24 activates, and begins to move toward the tube 10, while also beginning to spin, which spins the mandrel 28. The pilot section of the mandrel advances into the tube 10. The advance of the mandrel continues, with the forming lands 66, 68 contacting the sidewall of the tube 10. Lubricating oil is applied. The forming lands move into the tube 10, enlarging the end of the tube outward in a deepening bell. The mandrel continues to advance, until the lands have enlarged the end of the tube to the internal contour of the die cavity. The tube end arrives at the shape of FIG. 10.

The motor retracts, and with it, the mandrel retracts. Upon reaching full retraction, the motor stops. The die members 30, 32 are automatically separated, and the end gauge advances in preparation for the next tube.

The tube 10, now including a bell 12, is manually removed from the machinery. The tube 10 is manually located with the bell 12 inside a larger diameter tube, to the depth of the bell sidewall 14, and brazed. A tight, block-free, leak-free joint results, as in FIG. 13.

The preferred embodiment and the invention are now described in such full, clear, concise and exact terms as to enable a person of skill in the art to make and use the same. To particularly point out and distinctly claim the subject matter regarded as invention, the following claims conclude this specification.

What is claimed is:

1. A method of forming a joint between a workable tubing of a first diameter and a tubing of a second, larger diameter, the method comprising the steps of:

forming a bell in the end of the workable tubing, by steps including:

clamping the workable tubing with the end of the workable tubing located in a cavity of a die, spinning a mandrel, and inserting the spinning mandrel into the end of the workable tubing, the mandrel having a pilot tip, and a forming land, the forming land, while spinning with the mandrel and inserted into the end of the workable tubing, expanding the end of the workable tubing as the mandrel is spun;

the bell in the workable tubing having an outer diameter substantially equal to the inner diameter of the second, larger tubing;

freeing the workable tubing from the clamp and die;

inserting the bell into the second, larger tubing; and, brazing the two tubes;

whereby the bell fits closely within the larger tubing, the bell provides a visual guide to the accurate insertion of the first tubing a desired length into the second tubing, and whereby the two tubings are brazed to form a joint without need for a bushing.

2. An apparatus for the formation of joints between a workable tubing of a first diameter and a tubing of a second, larger diameter, the apparatus comprising, in combination:

means including a die defining a bell cavity, for clamping the workable tubing with the end of the workable tubing located in the cavity of the die, mandrel means;

means for spinning the mandrel means;

means for inserting the spinning mandrel means into the end of the workable tubing while the workable tubing is clamped;

the mandrel means having a pilot tip, and forming land means, the forming land means, while spinning with the mandrel and inserted into the end of the workable tubing, expanding the end of the workable tubing as the mandrel is spun;

whereby a bell is formed in the end of the workable tubing, the bell having an outer diameter substantially equal to the inner diameter of the second, larger tubing, and whereby the bell may be inserted into the second, larger tubing, and the two tubes brazed, and whereby the bell fits closely within the larger tubing, the bell provides a visual guide to the accurate insertion of the first tubing a desired length into the second tubing, and the two tubings are brazed to form a joint without need for a bushing.

* * * * *